US012797848B2

(12) United States Patent
Hage et al.

(10) Patent No.: US 12,797,848 B2
(45) Date of Patent: Nov. 17, 2026

(54) FLOW CELL BASED MOTION SYSTEM CALIBRATION AND CONTROL METHODS

(71) Applicant: ILLUMINA, INC., San Diego, CA (US)

(72) Inventors: Matthew Hage, San Diego, CA (US); John Earney, San Diego, CA (US); Gregory Holst, San Diego, CA (US); Mark Majette, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 536 days.

(21) Appl. No.: 18/474,589

(22) Filed: Sep. 26, 2023

(65) Prior Publication Data

US 2024/0100518 A1 Mar. 28, 2024

Related U.S. Application Data

(60) Provisional application No. 63/409,856, filed on Sep. 26, 2022.

(51) Int. Cl.
*B01L 3/00* (2006.01)

(52) U.S. Cl.
CPC . *B01L 3/502715* (2013.01); *B01L 2300/0654* (2013.01); *B01L 2300/0893* (2013.01); *B01L 2300/0896* (2013.01)

(58) Field of Classification Search
CPC ..... B01J 2219/0056; B01J 2219/00659; B01L 3/502715; B01L 9/527; B01L 9/56; B01L 2200/148; B01L 2300/0636; B01L 2300/0654; B01L 2300/0819; B01L 2300/0851; B01L 2300/0877; B01L 2300/0893; B01L 2300/0896; B01L 2300/168; G01N 21/6452
See application file for complete search history.

(56) References Cited

U.S. PATENT DOCUMENTS

2013/0100462 A1* 4/2013 Hollenbeck .......... G01N 21/253
356/614
2013/0203627 A1* 8/2013 Moll .................. G01N 21/7703
506/18

FOREIGN PATENT DOCUMENTS

WO WO-2018144582 A1 * 8/2018 ................ B01L 9/56

OTHER PUBLICATIONS

International Search Report and Written Opinion for PCT/US2023/033720 mailed Jan. 18, 2024, 12 pages.

* cited by examiner

*Primary Examiner* — Michael L Hobbs
(74) *Attorney, Agent, or Firm* — Fletcher Yoder, P.C.

(57) ABSTRACT

The presently described techniques relate generally to providing motion feedback (e.g., motion system calibration and/or sample alignment) in the context of an imaging system (such as a time delay and integration (TDI) based imaging system). The architecture and techniques discussed may achieve nanoscale control and calibration of a movement feedback system without a high-resolution encoder subsystem or, in the alternative embodiments, with a lower resolution (and correspondingly less expensive) encoder subsystem than might otherwise be employed. By way of example, certain embodiments described herein relate to ascertaining or calibrating linear motion of a sample holder surface using nanoscale features (e.g., sample sites or nanowells or lithographically patterned features) provided on a surface of the sample holder.

20 Claims, 7 Drawing Sheets

FLOW CELL BASED MOTION SYSTEM CALIBRATION AND CONTROL METHODS

CROSS REFERENCE TO RELATED APPLICATIONS

This application claims priority from and the benefit of U.S. Provisional Application Ser. No. 63/409,856, entitled "FLOW CELL BASED MOTION SYSTEM CALIBRATION AND CONTROL METHODS", filed Sep. 26, 2022, which is hereby incorporated by reference in its entirety for all purposes.

TECHNICAL FIELD

The present approach relates generally to the use of flow cell features for assessing or calibrating motion, position, and/or orientation of the flow cell during imaging. In accordance with this approach, the imaging system may operate without an encoder system (e.g., an optical encoder system) typically used to provide motion data and/or or may utilize an encoder system having reduced specifications (e.g., lower resolution or accuracy).

BACKGROUND

In a nucleic acid sequencing context, a sample holder (such as a flow cell or other sequencing substrate) for use in a sequencing instrument may provide a number of individual sites (e.g., sample wells or nanowells) at locations on a surface of the sample holder. Such sites may contain chemical groups or biological molecules, which can be identical or different among the many sites, and can interact with other materials of interest, such as molecules present within a biological sample. Sites can be located and/or analyzed by taking an image of the substrate surface, such as by taking a planar image or by sequential line scanning. The image data may be processed to locate and identify at least a portion of the sites and/or to obtain qualitative or quantitative measurements related to samples being analyzed. In such a context, where a chemical or biological interaction occurs at a particular site, the interaction may be detected at the site and correlated with the location and identity of the site, as well as the particular chemical group or molecule present at the site.

In a biological molecule sequencing context employing such substrates, sequencing instruments using a scanning imaging system may be used to generate high-quality images of the sequencing substrate, with the sequencing data quality typically corresponding to the quality of the images. In practice, the scanning imaging system may be a time delay and integration (TDI) imaging system that employs a TDI charge-coupled device (CCD) as an image sensor, which allows line images to be captured of moving objects (e.g., a moving sequencing substrate or flow cell surface) even at low-light levels. In such a system, generated signal associated with a given moving point on the surface is accumulated over a time interval (e.g., through a succession of line images) so that, even though the point has moved (e.g., undergone motion in a scan direction) during scanning, signals generated by a respective point within the time interval can be accumulated or summed so to generate a stronger signal than might be detected at a single instant in time. In this manner, a substrate or surface containing multiple sample sites or locations may be imaged while undergoing a linear motion and good signal quality obtained for the sample sites or locations.

As may be appreciated, in practice such a TDI imaging system used in a sequencing context requires very accurate and precise scanning controls and motion systems, which may be expensive in a commercial or real-world context. In particular, in the context of an imager suitable for use in a sequencing system, optical encoder systems may be employed as part of a control loop to relate linear motion of the imaged surface, such as a flow cell, with the operation of the TDI charge-coupled device. Further, such high-performance motion systems typically require precise calibration to function properly, which in turn may depend on relatively expensive structures (e.g., known nanoscale structures or grating) provided as interrogation targets for the encoder feedback system.

SUMMARY

The present techniques provide a time delay and integration (TDI) based sequencing imaging system or architecture for scanning a substrate having nanoscale features, such as nanowells suitable for sample processing, or other features discernible during a scan operation. In such imaging systems, it is important to know where the sample stage is located in the event of variable or improper motion. Conventionally, an optical encoder may be employed to provide such information, but such encoders may be expensive. With this in mind, in certain embodiments discussed herein, the optical encoder typically present in such a TDI imaging system as part of the scanning control subsystem (e.g., the motion feedback subsystem) is absent. Instead, the scanning control subsystem of the TDI imaging system obtains control and calibration feedback using the optical imaging system typically associated with sample data collection as well as features (e.g., nanowells) or a pattern or sequence of features present on the sample substrate, such as a surface of a flow cell. Alternatively, in other embodiments, the encoder employed may be of a lower accuracy or resolution than might otherwise be employed to achieve the desired motion control and calibration.

As may be further understood in view of the present description, the present techniques also include or otherwise provide for an article of manufacture, comprising a substrate, on which a plurality of sample sites are disposed at fixed, physical locations on the surface of the substrate. An example of such an article may include a patterned arrangement of sample sites associated with a sequencing flow cell, where some or all of the sites may be configured to hold a material of interest, such as a nucleic acid sample undergoing a sequencing operation.

With the preceding in mind, a respective embodiment of a patterned flow cell is provided. In accordance with this embodiment, the patterned flow cell comprises: a substrate and a plurality of sample sites formed in the substrate. The plurality of sample sites is arranged in a generally periodic pattern and includes known patterns or sub-patterns of sample sites such that imaging data collected of the sample sites over known time intervals may be used to calculate one or more of a linear velocity at which the substrate is being translated during a scan operation and/or a position of the substrate or flow cell in a given dimension (e.g., a scan direction dimension) at a given time. Such calculated velocity and/or position information, in conjunction with the corresponding timing, may be used to perform or facilitate other operations, such as triggering an optical imager (e.g., a camera) during a scan operation and/or generating one or more image correction factors that may be used for post-scan image correction or processing.

As discussed in further detail herein, in certain example embodiments a subset of features, such as nanowells, may be provided in a separate and distinct pattern or sub-pattern from the general feature pattern (e.g., a hexagonal grid) so as to provide an optically discernible feature set that may serve as reference markers or fiducials that may allow for the optical determination of translation velocity of the substrate while undergoing line-scan imaging during the scan operation. By way of example, a sub-pattern or sequential arrangement of features may be provided that is optically discernible in a scanning direction during a scanning operation of the flow cell so as to form a consistent sequence of features that maybe used for position or velocity measurement in the scanning direction. In yet further embodiments the sample sites forming the sub-pattern or sequential arrangement may be varied in accordance with one or more geometric properties, such as diameter, so as to provide a graded signal that may be useful in generating a more highly resolved sinusoidal waveform from which position and/or scan direction velocity information may be derived. Similarly, in yet further embodiments, one or more contiguous regions (e.g., reflective or fluorescing "bars" or "lines") provided in a pattern or sequence in the scanning direction may be employed so as to maximize signal usable to derive the scan direction velocity information and/or position data while minimizing the surface area allocated for generating such data. In practice, such features or patterns of features, and more particularly the varied sinusoidal signal generated based on the optical system measurements of the features as they are linearly translated, may function as the "tick" marks that might otherwise be separately provided in an encoder-based system, but without the need for an encoder to obtain the corresponding position and/or motion data.

In a further embodiment, a sequencing instrument is provided. In accordance with this embodiment, the sequencing instrument comprises: a sample stage configured to support a flow cell; an imager sub-system comprising an objective lens, a photodetector, and a light source configured to operate in combination to image the flow cell when present on the sample stage; and a controller configured to perform operations comprising: linearly translating the sample stage holding the flow cell during a scanning operation; using the imager sub-system, line scanning a plurality of sample sites formed in a top surface of the flow cell while the flow cell is linearly translated; deriving at least a linear translation velocity of the flow cell based on the image data acquired while line scanning the surface of the flow cell in which the sample sites are formed; and adjusting or calibrating one or both of a relative stage motion associated with linearly translating the flow cell or a signal integration performed on intensity data measured for the sample sites as part of line scanning the plurality of sample sites.

In one embodiment, a patterned flow cell is provided. In accordance with this embodiment the patterned flow cell comprises: a substrate and a plurality of sample sites in a non-fiducial region of the substrate. The plurality of sample sites are arranged in a periodic pattern. The patterned flow cell further comprises a plurality of sample site-based fiducials formed on the substrate in a scanning direction. The sample-site-based fiducials comprise an arrangement of sample sites and blank regions formed linearly in a first dimension associated with a scan direction of the patterned flow cell.

In a further embodiment, a patterned flow cell is provided. In accordance with this embodiment the patterned flow cell comprises: a substrate and a plurality of sample sites in a non-fiducial region of the substrate, wherein the plurality of sample sites are arranged in a periodic pattern. The patterned flow cell further comprises a plurality of fiducials provided on the substrate in a first dimension associated with a scan direction of the patterned flow cell. Each fiducial comprise a plurality of features that are separated by one or more blank regions. Each feature is contiguous across one or more columns of the periodic pattern.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
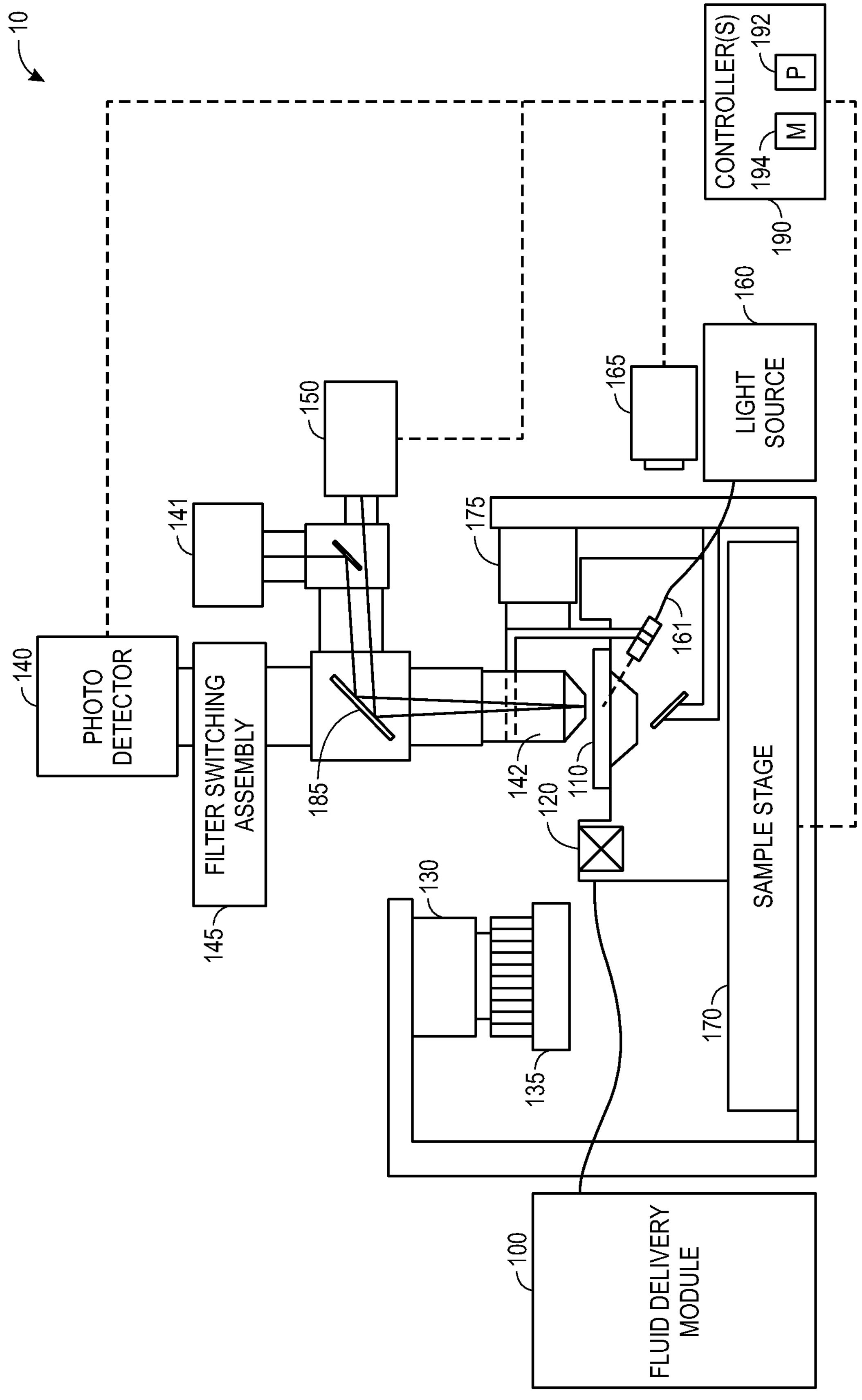
FIG. 1 illustrates a high-level overview of one example of an image scanning system, in accordance with aspects of the present disclosure.

Methods and systems described herein provide for motion feedback (e.g., motion system calibration and/or sample alignment), camera control, and/or image correction in the context of an imaging system (such as a time delay and integration (TDI) based imaging system) that may be used in nucleic acid sequencing or other nanoscale-feature imaging and processing operations. The architecture and techniques discussed herein achieve control and calibration of a movement feedback system without a high resolution (and correspondingly expensive) optical encoder subsystem or, in the alternative embodiments, with a lower resolution (and correspondingly less expensive) encoder subsystem than might otherwise be employed. In particular, this is accomplished by using features (e.g., nanowells or other nanoscale features) or patterns of such features present on the imaged substrate (e.g., flow cell surface) as part of the motion-feedback system. By way of example, in one nucleic acid sequencing embodiment a pattern or sequence (e.g., a specialized or optically discernible pattern) of nanowells on a flow cell is used to derive motion feedback for the sequencing imager using existing imaging components of the imager and not using an encoder.

As discussed herein, the described techniques allow, among other things, next generation sequencing (NGS) instruments to be employed without the additional cost and complexity of separate motion feedback systems (e.g., optical encoders). Further, in addition to the technical benefit of being able to omit the encoder subsystem (with the corresponding cost and complexity benefits) while still achieving effective alignment and motion calibration, the feature-based feedback approach described herein can provide improved performance relative to conventional approaches as there is no abstraction of the motion measurement away from the sample being imaged, as occurs in encoder-based motion feedback systems.

In certain embodiments discussed herein, during a scan operation features of the substrate (e.g., a nanowells formed on a flow cell) may generate measured intensity data (e.g., fluorescence data) that is modulated based on a pattern or sequence associated with the features and that may be processed to derive one or more of velocity (e.g., linear motion velocity), position (e.g., in an x- and/or y-dimension), rotation, skew, or other feedback data that may be employed to adjust or calibrate a motion sub-system in real time such that relative motion of the sample substrate may be adjusted or corrected on-the-fly. Additionally or alternatively, such derived motion data (e.g., linear motion velocity) may be incorporated into controlling the camera(s) employed as part of the line imaging operation. Further, such derived data may be used as part of the image or data processing as well, such as to calibrate a signal integration step in a TDI scanning operation and/or to otherwise facilitate image correction subsequent to data acquisition.

With the preceding in mind, and by way of further background, as discussed herein patterned surfaces may be provided as part of a sample holder or sample holder substrate, the processing of which produces image data, or other forms of detection output, of sites on the surface. By way of example, such a sample holder may be a type of analytical sample holder, such as those used for the analysis of biological samples. Such patterned surfaces may contain repeating patterns of features (e.g., sample sites, such as sample wells or nanowells, or patterned lithographic features) that are to be resolved at a suitable resolution (e.g., sub-micron resolution ranges) for which the methods and systems described herein are suited. In many applications, the sample material to be imaged and analyzed will be located on a surface of the sample holder which may be formed using a glass material or a multi-layer composite structure (e.g., functional layers, substrate layers, fluid channels, and so forth). Various chemical or structural features may be employed at sample sites to bind or anchor (or to otherwise localize) segments or fragments of material to be processed (e.g., hybridized, combined with additional molecules (e.g., labels or tags), imaged, and analyzed). Fiducial markers or regions, or simply “fiducials” are typically located at known locations with respect to the sites to assist in locating the support in the system (e.g., for imaging) and for locating the sites in subsequent image data.

As discussed in greater detail below, sequencing instruments that employ a scanning imaging system (e.g., an imager) typically move the imaged substrate and imaging optics relative to one another during operation. In practice, the imaged substrate may be a flow cell. As used herein, a “flow cell”, which may also be referred to as “sequence flow cells” or “patterned flow cells”, may be understood to be a sample holding and/or processing structure or device. Such devices comprise sites (i.e., nanoscale sample sites or binding sites) at which analytes may be located for processing and analysis.

As further discussed herein, in a nucleic acid sequencing technique, oligomeric or polymeric chains of nucleic acids, which may be spatially separated and localized on a substrate, may be subjected to several cycles of biochemical processing and imaging. In some examples, each cycle can result in one of four different labels being detected at each feature, depending upon the nucleotide base that is processed biochemically in that cycle. In such examples, multiple (e.g., four) different images are obtained at a given cycle and each feature will be detected in the images. Sequencing includes multiple cycles, and alignment of features represented in image data from successive cycles is used to determine the sequence of nucleotides at each site based on the sequence of labels detected at the respective site. In a time delay and integration (TDI) imaging system, the imaging of each location may be performed over a time interval while the substrate undergoing motion undergoes relative linear motion along a scanning direction dimension with respect to the imaging components, with the observed signal attributed to a given sample site or location being integrated or summed based on the known relative linear motion of the surface over time. By integrating signals in this manner, a stronger signal may be generated for a given sample site, even in the presence of a respectively weak observed signal. To perform the signal integration, however, very accurate scanning controls and knowledge of the actual motion of the sample surface is needed so that signals acquired at different times are integrated properly.

Several examples will be described herein for ascertaining or calibrating linear motion of a sample holder surface using features (e.g., sample sites or nanowells or lithographically patterned features) provided on an imaged surface of the sample holder. It will be understood that systems are also provided for carrying out the methods in an automated or semi-automated way, and such systems will include a processor; a data storage device; and a program for image analysis, the program including instructions for carrying out one or more methods provided for processing or leveraging motion and/or rotational data, such as signal integration, image registration, distortion correction, and so forth. Accordingly, methods discussed herein can be carried out on a computer, for example, having components and executable routines needed for such purposes.

The methods and systems described herein may be employed for analyzing any of a variety of materials, such as biological samples and molecules, which may be on or in a variety of objects. Useful objects include, but are not limited to, solid supports or solid-phase surfaces with attached analytes. The methods and systems set forth may provide advantages when used with objects having a repeating pattern of features in an x, y plane, such as a patterned flow cell having an attached collection of molecules, such as DNA, RNA, biological material from viruses, proteins, antibodies, carbohydrates, small molecules (such as drug candidates), biologically active molecules, or any other analytes of interest.

An increasing number of analytic and diagnostic applications have been developed using substrates with patterned arrangements of features (e.g., sample wells or sites) for attaching or processing biological molecules, such as nucleic acids and polypeptides. Such patterned features may include bound DNA or RNA probes. These are specific for nucleotide sequences present in plants, animals (e.g., humans), and other organisms. In some applications, for example, individual DNA or RNA probes can be attached at individual features of a surface of a patterned flow cell. A test sample, such as from a known or unknown person or organism, can be exposed to the sites, such that target nucleic acids (e.g., gene fragments, mRNA, or amplicons thereof) hybridize to complementary probes at respective sites in the pattern of sites. The probes can be labeled in a target specific process, such as using labels present on the target nucleic acids or due to enzymatic labeling of the probes or targets that are present in hybridized form at the features. The patterned surface can then be examined, such as by scanning specific frequencies of light over the features to identify which target nucleic acids are present in the sample.

Patterned flow cells may be used for genetic sequencing and similar applications. In general, genetic sequencing includes determining the order of nucleotides in a length of target nucleic acid, such as a fragment of DNA or RNA. Relatively short sequences may be sequenced at each nanowell present on the flow cell, and the resulting sequence information may be used in various bioinformatics methods to logically fit the sequence fragments together, so as to reliably determine the sequence of much more extensive lengths of genetic material from which the fragments are available. Automated, processor-executable routines for characterizing fragments may be employed, and have been used in endeavors such as genome mapping, identification of genes and their function, and so forth. Patterned arrangements of sample sites on a surface are useful for characterizing genomic content because a large number of variants may be present and this supplants the alternative of performing many experiments on individual probes and targets. Thus, the patterned surface (such as a patterned surface of a flow cell) may be a useful platform for performing such investigations in a practical manner.

Patterned surfaces used for nucleic acid sequencing often have random spatial patterns of nucleic acid features. For example, HiSeg™ or MiSeg™ sequencing platforms available from Illumina, Inc. utilize flow cells comprising supports (e.g., surfaces) upon which nucleic acid(s) is/are disposed by random seeding followed by bridge amplification. However, patterned surfaces (upon which discrete reaction sites are formed in a pattern on the surface) can also be used for nucleic acid sequencing or other analytical applications. Example patterned surfaces, methods for their manufacture and methods for their use are set forth in U.S. Pat. Nos. 9,512,422; 8,895,249; and 9,012,022; and in U.S. Pat. App. Pub. Nos. 2013/0116153 A1; and 2012/0316086 A1, each of which is incorporated herein by reference in its entirety. The features (e.g., reaction or capture sites, such as nanowells) of such patterned surfaces can be used to capture a single nucleic acid template molecule to seed subsequent formation of a homogenous colony, for example, via bridge amplification. Such patterned surfaces are useful for nucleic acid sequencing applications.

The size of the features, such as reaction or sample binding sites (e.g., sample wells or nanowells) on a patterned surface (or other patterned features used in a method or system as described herein), can be selected to suit a desired application. In some non-limiting examples, a sample site feature of a patterned surface can have a size that accommodates only a single nucleic acid molecule. A surface having a plurality of features in this size range is useful for constructing a pattern of molecules for detection at single molecule resolution. Features in this size range are also useful in patterned surfaces having features that each contain a colony of nucleic acid molecules. Thus, the features of a patterned surface can each have an area that is no larger than about 1 $mm^2$, no larger than about 500 $\mu m^2$, no larger than about 100 $\mu m^2$, no larger than about 10 $\mu m^2$, no larger than about 1 $\mu m^2$, no larger than about 500 $nm^2$, no larger than about 100 $nm^2$, no larger than about 10 $nm^2$, no larger than about 5 $nm^2$, or no larger than about 1 $nm^2$. Alternatively or additionally, the features of a patterned surface will be no smaller than about 1 $mm^2$, no smaller than about 500 $\mu m^2$, no smaller than about 100 $\mu m^2$, no smaller than about 10 $\mu m^2$, no smaller than about 1 $\mu m^2$, no smaller than about 500 $nm^2$, no smaller than about 100 $nm^2$, no smaller than about 10 $nm^2$, no smaller than about 5 $nm^2$, or no smaller than about 1 $nm^2$. Indeed, a feature can have a size that is in a range between an upper and lower limit selected from those exemplified above. Although several size ranges for features of a surface have been exemplified with respect to nucleic acids and on the scale of nucleic acids, it will be understood that features in these size ranges can be used for applications that do not include nucleic acids. It will be further understood that the size of the features need not necessarily be confined to a scale used for nucleic acid applications.

For examples that include an object (e.g., a flow cell surface) having a plurality of features, the features (e.g., nanowells) can be discrete, being separated with spaces between each other. A patterned flow cell surface useful in the present context can have nanowells that are separated by edge-to-edge distance of at most about 100 μm, about 50 μm, about 10 μm, about 5 μm, about 1 μm, about 0.5 μm, or less. Alternatively or additionally, a patterned surface can have sample sites that are separated by an edge-to-edge distance of at least about 0.5 μm, about 1 μm, about 5 μm, about 10 μm, about 50 μm, about 100 μm, or more. These example ranges are provided by way of context, are non-limiting, and can apply to the average edge to edge spacing for sample sites, as well as to the minimum or maximum spacing.

The size of the sample sites and/or pitch of the sample sites can vary such that the sample sites on a patterned surface can have a desired density. For example, the average sample site pitch in a regular pattern can be at most about 100 μm, about 50 μm, about 10 μm, about 5 μm, about 1 μm, about 0.5 μm, or about 350 nm, or less. Alternatively or additionally, the average sample site pitch in a regular pattern can be at least about 0.5 μm, about 1 μm, about 5 μm, about 10 μm, about 50 μm, or about 100 μm or more. These ranges can apply to the maximum or minimum pitch for a regular pattern as well. For example, the maximum sample site pitch for a regular pattern can be at most about 100 μm, about 50 μm, about 10 μm, about 5 μm, about 1 μm, or about 0.5 μm or less; and/or the minimum sample site pitch in a regular pattern can be at least about 0.5 μm, about 1 μm, about 5 μm, about 10 μm, about 50 μm, or about 100 μm or more.

The density of sample sites on a patterned surface can also be understood in terms of the number of sample sites present per unit area. For example, the average density of sample sites on a patterned surface can be at least about $1\times10^3$ sample sites/$mm^2$, about $1\times10^4$ sample sites/$mm^2$, about $1\times10^5$ sample sites/$mm^2$ about $1\times10^6$ sample sites/$mm^2$, about $1\times10^7$ sample sites/$mm^2$, about $1\times10^8$ sample sites/$mm^2$, or about $1\times10^9$ sample sites/$mm^2$ or higher. Alternatively or additionally, the average density of sample sites on a patterned surface can be at most about $1\times10^9$ sample sites/$mm^2$, about $1\times10^8$ sample sites/$mm^2$, about $1\times10^7$ sample sites/mm$^2$, about $1\times10^6$ sample sites/mm$^2$, about $1\times10^5$ sample sites/mm$^2$, about $1\times10^4$ sample sites/mm$^2$, or about $1\times10^3$ sample sites/mm$^2$ or less.

The sample sites provided on a patterned surface can have any of a variety of shapes, cross-sections, and layouts. For example, when observed in a two-dimensional plane, such as on a surface, the sample sites can have a perimeter that is rounded, circular, oval, rectangular, square, symmetric, asymmetric, triangular, polygonal, or the like. The sample sites can be arranged, or predominantly arranged, in a regular repeating pattern including, for example, a hexagonal or rectilinear pattern. A pattern can be selected to achieve a desired level of packing. For example, round sample sites are optimally packed in a hexagonal arrangement. Other packing arrangements can also be used for round features and vice versa.

In general, a patterned surface might be characterized in terms of the number of sample sites that are present in a subset that forms the smallest geometric unit of the pattern. The subset can include, for example, at least 2, 3, 4, 5, 6, 10 or more sample sites. Depending upon the size and density of the sample sites, the geometric unit can occupy an area of less than about 1 mm$^2$, about 500 μm$^2$, about 100 μm$^2$, about 50 μm$^2$, about 10 μm$^2$, about 1 μm$^2$, about 500 nm$^2$, about 100 nm$^2$, about 50 nm$^2$, or about 10 nm 2 or less. Alternatively or additionally, the geometric unit can occupy an area of greater than about 10 nm$^2$, about 50 nm$^2$, about 100 nm$^2$, about 500 nm$^2$, about 1 μm$^2$, about 10 μm$^2$, about 50 μm$^2$, about 100 μm$^2$, about 500 μm$^2$, or about 1 mm 2 or more. Characteristics of the sample sites in a geometric unit, such as shape, size, pitch and the like, can be selected from those set forth herein more generally with regard to sample sites provided on a patterned surface.

A surface having a regular pattern of sample sites can be ordered with respect to the relative locations of the sample sites but random with respect to one or more other characteristic of each sample site. For example, in the case of a nucleic acid sequencing surface, the nucleic acid sample sites can be ordered with respect to their relative locations but random with respect to one's knowledge of the sequence for the nucleic acid species present at any sample site. As a more specific example, nucleic acid sequencing surfaces formed by seeding a repeating pattern of sample sites (e.g., hexagonally arranged nanowells) with template nucleic acids and amplifying the template at each feature to form copies of the template at the sample site (e.g., via cluster amplification or bridge amplification) will have a regular pattern of nucleic acid sample sites but will be random with regard to the distribution of sequences of the nucleic acids across the pattern. Thus, detection of the presence of nucleic acid material on the surface can yield a repeating pattern of features, whereas sequence specific detection can yield non-repeating distribution of signals across the surface.

As may be appreciated, the description of patterns, order, randomness and so forth provided herein not only pertains to sample sites on objects (e.g., a solid substrate having such sample sites, such as nanowells on solid-supports or surfaces), but also to image data, or images generated from such image data, that includes or depicts such an object having features as described herein. As such, patterns, order, randomness and so forth can be present in any of a variety of formats that are used to store, manipulate or communicate image data including, but not limited to, a computer readable medium or computer component such as a graphical user interface or other output device.

As discussed above and throughout, patterned flow cells in accordance with the presently described techniques, have a regular pattern of sample sites (e.g., wells or nanowells) imprinted in the surfaces of the flow cell. This pattern is normally hexagonal or square, and can have different orientations. In practice, a hexagonal pattern is conventionally used in current systems that employ a linear scanning imaging system. In such contexts, the hexagonal pattern may typically have one axis aligned at right angles to the scanning direction, y (i.e., the scanning axis of the sample substrate along which the substrate is typically linearly advanced during a scan operation). This cross-sample direction or axis (i.e., the x-dimension) is typically referred to as "horizontal" due to how images are normally presented with the image "vertical" axis being aligned with the scanning direction (i.e., the y-dimension). In practice, linear images may be acquired during a scan operation in the x-dimension, with the substrate being moved continuously or stepwise in the y-dimension (i.e., the scanning direction) so as to allow a surface to be imaged as sequential linear segments. In this context, and as further noted below, the z-dimension is orthogonal to both the x- and y-dimensions and corresponds to depth in such an imaging geometry. Location of the individual nanowells is typically made possible by using fiducials in known locations on the flow cell pattern.

As discussed herein, in accordance with various implementations certain flow cell features (e.g., sample nanowells or other lithographically patterned features) may themselves be used as part of a linear motion control and calibration feedback system. By way of example, in certain embodiments the patterning of the nanowells or other features may be employed as part of the motion feedback analysis. This is in contrast to optical encoder-based approaches in which a known grating that is separate from the sample space is interrogated by the encoder to generate feedback used as part of a closed control loop to assure proper linear motion.

In contrast, the techniques discussed herein enable direct imaging of flow cell patterned features to estimate position and/or linear motion. Further, the techniques discussed herein may be performed without an optical encoder feedback sub-system. Such encoder sub-systems add cost and complexity to the overall sequencing imager system. Conversely, the presently disclosed techniques may utilize one or more aspects or components (such as the optical imaging system) of the sequencing imager system. In other embodiments, an optical encoder may still be present or employed for linear motion feedback, but such an encoder may be of a lower resolution or scale (and correspondingly less expensive) than would otherwise be used to generate motion feedback and/or calibration data.

While the preceding provides useful background and context with respect to terminology and processes, the following provides an example of suitable systems and functional workflows that may utilize or process sample substrates using motion feedback techniques and sub-systems as described herein. By way of example, FIG. 1 depicts an example of an optical image scanning system 10, such as a sequencing system, that may be used in conjunction with the disclosed motion feedback and calibration techniques to process biological samples. With respect to such an imaging system 10, it may be appreciated that such imaging systems typically include a sample stage or support that holds a sample or other object to be imaged (e.g., a flow cell or sequencing cartridge having a patterned surface of spaced apart sample sites, such as sample wells) and an optical stage that includes the optics used for the imaging operations.

Turning to FIG. 1, the example imaging scanning system 10 may include a device for obtaining or producing an image of a region of a sample holder or substrate, such as line image data of a flow cell acquired as the flow cell is linearly displaced along the scanning direction. The example illustrated in FIG. 1 shows an example image scanning system configured in a backlit operational configuration, though a frontlit configuration may alternatively be employed. In the depicted example, subject samples are located on sample holder 110 (such as a flow cell), which is positioned on a sample stage 170 under an objective lens 142. Light source 160 and associated optics direct a beam of light to a chosen sample location on the sample holder 110. The sample fluoresces and the resultant light is collected by the objective lens 142 and directed to a photodetector 140 to detect the florescence. Sample stage 170 is moved relative to objective lens 142 to position the next sample location on sample holder 110 at the focal point of the objective lens 142. Movement of sample stage 170 relative to objective lens 142 can be achieved by moving the sample stage itself, the objective lens, the entire optical stage, or any combination of these structures. Further examples may also include moving the entire imaging system over a stationary sample.

A fluid delivery module or device 100 directs a flow of reagents (e.g., fluorescent nucleotides, buffers, enzymes, cleavage reagents, etc.) to (and through) the sample holder 110 and waste valve 120. In some applications, the sample holder 110 can be implemented as a flow cell that includes clusters of nucleic acid sequences at a plurality of sample locations on the sample holder 110. The samples to be sequenced may be attached to the substrate of the flow cell, along with other optional components. In practice, the plurality of sample locations provided on a surface of the flow cell may be arranged as spaced apart sample sites (e.g., wells or nanowells), which in turn may be subdivided into tile, sub-tile, and line regions each comprising a corresponding subset of the plurality of sample locations.

The depicted example image scanning system 10 also comprises temperature station actuator 130 and heater/cooler 135 that can optionally regulate the temperature or conditions of the fluids within the sample holder 110. A camera system (e.g., photodetector system 140) can be included to image the sample holder 110. The photodetector system 140 can be implemented, for example, as a CCD camera, which can interact with various filters within filter switching assembly 145, objective lens 142, and focusing assembly (e.g., focusing light emitter 150 and focusing detector 141). The photodetector system 140 is not limited to a CCD camera and other cameras and image sensor technologies can be used.

With respect to the presently described techniques, in certain implementations aspects of the optical imaging sub-system may be employed as part of a motion feedback system. By way of example, and as discussed herein, components of the optical imaging sub-system may be employed to image the pattern of sample sites present on the substrate being scanned during the scan operation so as to generate image data that can be processed to provide feedback to the motion feedback system, which in turn controls relative linear motion of the substrate during the scan operation, to provide feedback used to control camera operation of the optical imaging sub-system, and/or to facilitate integration of the scanned image data subsequent to the scan operation. By way of example, in a time delay and integration (TDI) based image scanner, such as a line imager, such motion feedback data may be employed in real-time or near real-time to control linear motion of the scanned substrate so to allow the precise position encoding needed for signal integration over the imaging window. In such contexts, a separate and distinct encoder feedback system may be omitted or, if present, may operate at a reduced resolution relative to what would otherwise be employed for TDI imaging.

Light source 160 (e.g., an excitation emitter within an assembly optionally comprising multiple emitters) or another light source, such as a superluminescent diode(s) (SLED), can be included to illuminate fluorescent sequencing reactions within the samples via illumination through a fiber optic interface 161 (which can optionally comprise one or more re-imaging lenses, a fiber optic mounting, etc.). Low watt lamp 165 and reverse dichroic 185 are also presented in the example shown.

Although illustrated as a backlit device, other examples may include a light from a laser, superluminescent light emitting diode (SLED), or other light source that is directed through the objective lens 142 onto the samples on sample holder 110 (i.e., a frontlit configuration). Sample holder 110 can be mounted on a sample stage 170 to provide movement and alignment of the sample holder 110 relative to the objective lens 142. The sample stage 170 can have one or more actuators to allow it to move in any of three directions. For example, in terms of the Cartesian coordinate system, actuators can be provided to allow the stage to move in the x-, y- and z-directions relative to the objective lens 142. This can allow one or more sample locations on sample holder 110 to be positioned in optical alignment with objective lens 142.

A focus component 175 is shown in this example as being included to control positioning of the optical components relative to the sample holder 110 in the focus direction (typically referred to as the z-axis, or z-direction). Focus component 175 can include one or more actuators physically coupled to the optical stage or the sample stage, or both, to move sample holder 110 on sample stage 170 relative to the optical components (e.g., the objective lens 142) to provide proper focusing for the imaging operation. For example, the actuator may be physically coupled to the respective stage such as, for example, by mechanical, magnetic, fluidic or other attachment or contact directly or indirectly to or with the stage. The one or more actuators can be configured to move the stage in the z-direction while maintaining the sample stage in the same plane (e.g., maintaining a level or horizontal attitude, perpendicular to the optical axis). The one or more actuators can also be configured to tilt the stage. This can be done, for example, so that sample holder 110 can be leveled dynamically to account for any slope in its surfaces.

Focusing of the system generally refers to aligning the focal plane of the objective lens 142 with the sample to be imaged at the chosen sample location. However, focusing can also refer to adjustments to the system to obtain or enhance a desired characteristic for a representation of the sample such as, for example, a desired level of sharpness or contrast for an image of a test sample. Because the usable depth of field of the focal plane of the objective lens 142 may be very small (sometimes on the order of 1 μm or less), focus component 175 closely follows the surface being imaged. Because the sample container may not be perfectly flat as fixtured in the instrument, focus component 175 may be set up to follow this profile while moving along in the scanning direction (typically referred to as the y-axis).

The light emanating from a test sample at a sample location being imaged can be directed to one or more photodetectors 140. Photodetectors can include, for example a CCD camera. An aperture can be included and positioned to allow only light emanating from the focus area to pass to the photodetector(s). The aperture can be included to improve image quality by filtering out components of the light that emanate from areas that are outside of the focus area. Emission filters can be included in filter switching assembly 145, which can be selected to record a determined emission wavelength and to block any stray light.

In various examples, sample holder 110 (e.g., a flow cell) can include one or more substrates upon which the samples are provided. For example, in the case of a system to analyze a large number of different nucleic acid sequences, sample holder 110 can include one or more substrates on which nucleic acids to be sequenced are bound, attached or associated. In various examples, the substrate can include any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or pattern across the sample.

One or more controllers 190 (e.g., processor or ASIC based controller(s)) can be provided to control the operation of a scanning system, such as the example image scanning system 10 described with reference to FIG. 1. The controller 190 can be implemented to control aspects of system operation such as, for example, focusing, stage movement and/or relative linear motion of the sample relative to the optics, and imaging operations. In various applications, the controller can be implemented using hardware, software, or a combination of the preceding. For example, in some implementations the controller can include one or more CPUs or processors 192 with associated memory 194. As another example, the controller can comprise hardware or other circuitry to control the operation. For example, this circuitry can include one or more of the following: field programmable gate arrays (FPGA), application specific integrated circuits (ASIC), programmable logic devices (PLD), complex programmable logic devices (CPLD), a programmable logic array (PLA), programmable array logic (PAL), or other similar processing device or circuitry. As yet another example, the controller can comprise a combination of this circuitry with one or more processors.

With respect to the present discussion, it may be appreciated that the one or more controllers 190 may further be configured to facilitate or perform operations related to relative motion control and calibration of the surface being scanned during a scan operation (e.g., a TDI line scanning operation). By way of example, the controller(s) 190 may control operation of the optical imaging sub-system during all or part of a scan operation, may receive measurement data from the optical imaging sub-system during operation, may perform calculations determining the motion (e.g., linear motion) velocity of the substrate based upon the measurement data generated by the optical imaging sub-system, and/or may adjust or calibrate the relative motion or other translation parameter of the substrate during a scan operation based upon the measurement data generated by the optical imaging sub-system. Similarly, the controller(s) 190 may control or modify processing of acquired image data (e.g., line image data) based upon the determined velocity of the substrate during a scan operation. By way of example, the calculation of an integrated signal strength for a sample site may utilize the determined velocity of the substrate during the scan operation so as to properly allocate or attribute measured signal over a given time interval to a given location on the substrate. Although motion feedback and control with respect to the movement and imaging of the sample substrate is described and discussed herein in the context of this example system, this is only one example with which these techniques might be implemented. After reading this description, one of ordinary skill in the art will understand how the systems and methods described herein can be implemented with this and other scanners, microscopes and other imaging systems.

Figure 2:
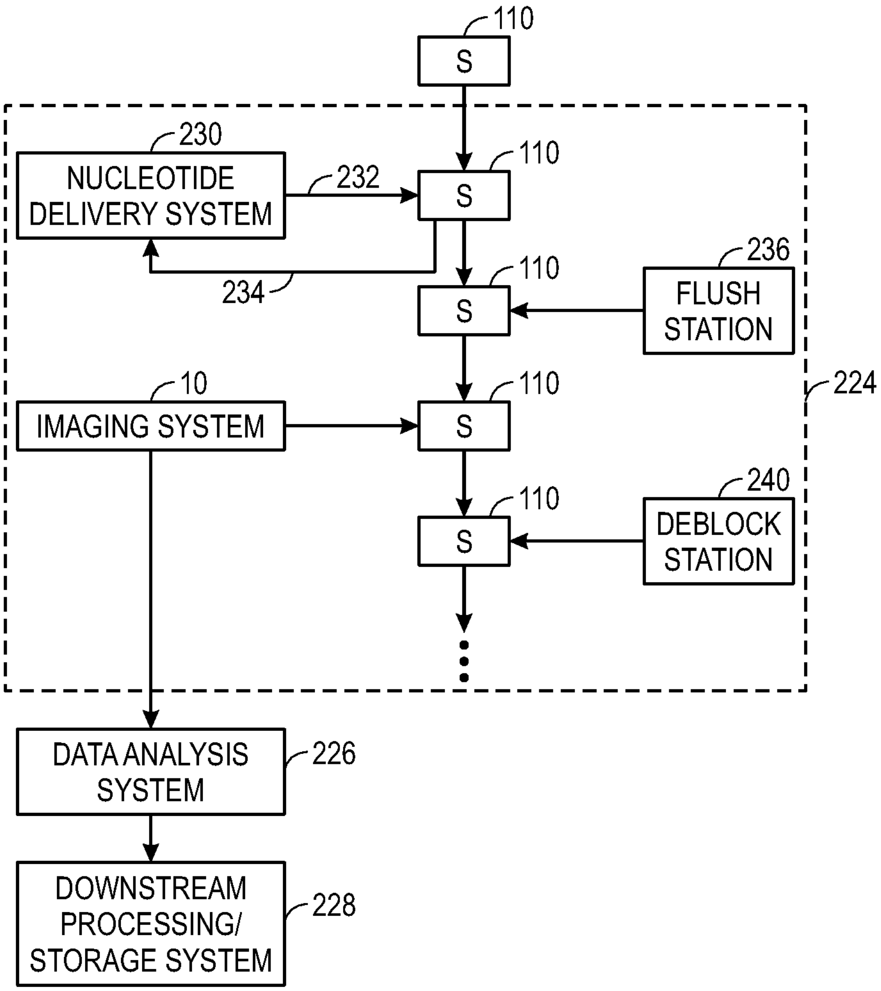
FIG. 2 is a block diagram illustration of an imaging and image processing system, such as for biological samples, in accordance with aspects of the present disclosure.
Figure 3:
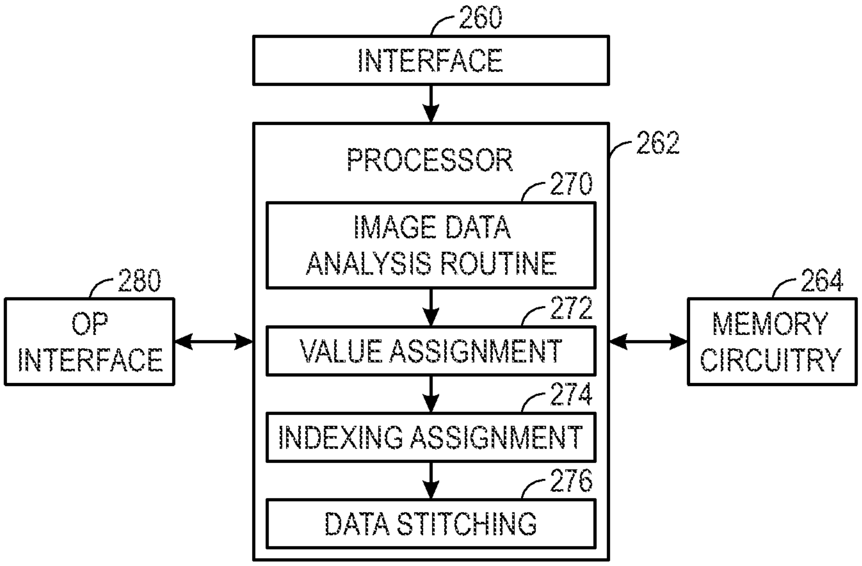
FIG. 3 is a diagrammatical overview of functional components that may be included in a data analysis system for use in a system of the type illustrated in FIG. 2.

While the preceding description covers aspects of an optical image scanning system 10, such as a sequencing system, FIGS. 2 and 3 discuss the use of such a system 10 in the context of a functional work flow. This discussion is provided in order to provide useful, real-world context for the subsequent discussion of a scan operation and the use of a motion monitoring and calibration feedback system utilizing features on the surface of the substrate being scanned, as discussed herein. In this manner, it is hoped that the use and significance of the motion feedback system and techniques in the approaches subsequently described will be more fully appreciated.

With this in mind, and turning to FIG. 2, a block diagram illustrating an example work flow in conjunction with system components is provided. In this example, the work flow and corresponding system components may be suitable for processing patterned flow cells (such as for biological applications), imaging the patterned flow cell surface, and analyzing data derived from the imaging.

In the illustrated example, molecules (such as nucleotides, oligonucleotides, and other bioactive reagents) may be introduced into respective sample holders 110 that may be prepared in advance. As noted herein, such sample holders 110 may comprise flow cells, sequencing cartridges, or other suitable structures having substrates encompassing sample sites for imaging. The depicted work flow with system components may be utilized for synthesizing biopolymers, such as DNA chains, or for sequencing biopolymers. However, it should be understood that the present technique is not limited to sequencing operations, gene expression operations, diagnostic applications, and so forth, but may be used more generally for analyzing collected image data for multiple lines, swaths or regions detected from imaging of a sample or sample holder, as described below. Other substrates containing reaction or capture sites for molecules or other detectable features can similarly be used with the techniques and systems disclosed.

In the present context, example biopolymers may include, but are not limited to, nucleic acids, such as DNA, RNA, or analogs of DNA or RNA. Other example biopolymers may include proteins (also referred to as polypeptides), polysaccharides, or analogs thereof. Although any of a variety of biopolymers may be processed in accordance with the described techniques, to facilitate and simplify explanation the systems and methods used for processing and imaging in the example context will be described with regard to the processing of nucleic acids. In general, the described work flow will process sample holders 110, each of which may include a patterned surface of reaction sites (e.g., nanowells). As used herein, a "patterned surface" refers to a surface of a support or substrate having a population of different discrete and spaced apart reaction sites in a known pattern or geometry, such that different reaction sites can be differentiated from each other according to their relative location. A single species of biopolymer may be attached to each individual reaction site. However, multiple copies of a species of biopolymer can be attached to a reaction site. The pattern, taken as a whole, may include a plurality of different biopolymers attached at a plurality of different sites. Reaction sites can be located at different addressable locations on the same substrate. Alternatively, a patterned surface can include separate substrates each forming a different reaction site. The sites may include fragments of DNA attached at specific, known locations, or may be wells or nanowells in which a target product is to be synthesized. In some applications, the system may be designed for continuously synthesizing or sequencing molecules, such as polymeric molecules based upon common nucleotides.

In the diagrammatical representation of FIG. 2, an analysis system may include a processing system 224 (e.g., a sequencing system or station) designed to process samples provided within sample holders 110 (such as may include biological patterned surfaces), and to generate image data representative of individual sites on the patterned surface, as well as spaces between sites, and representations of fiducials provided in or on the patterned surface. A data analysis system 226 receives the image data (e.g., discrete lines of image data in a TDI imaging system context) and processes the image data in accordance with the present disclosure to extract meaningful values from the imaging data as described herein. A downstream processing/storage system 228, then, may receive this information and store the information, along with imaging data, where desired. The downstream processing/storage system 228 may further analyze the image data or processed data derived from the image data, such as to diagnose physiological conditions, compile sequencing lists, analyze gene expression, and so forth.

The processing system 224 may employ a biomolecule reagent delivery system (shown as a nucleotide delivery system 230 in the example of FIG. 2) for delivering various reagents to a sample holder 110 as processing progresses. The biomolecule reagent delivery system may correspond to the fluid delivery module or device 100 of FIG. 1. Processing system 224 may perform a plurality of operations through which sample holder 110 and corresponding samples progress. This progression can be achieved in a number of ways including, for example, physical movement of the sample holder 110 to different stations, or loading of the sample holder 110 (such as a flow cell) in a system in which the sample holder 110 is moved or an optical system is moved, or both, or the delivery of fluids is performed via valve actuation. A system may be designed for cyclic operation in which reactions are promoted with single nucleotides or with oligonucleotides, followed by flushing, imaging, and de-blocking in preparation for a subsequent cycle. In a practical system, the sample holders 110 and corresponding samples are disposed in the processing system 224 and an automated or semi-automated sequence of operations is performed for reactions, flushing, imaging, de-blocking, and so forth, in a number of successive cycles before all useful information is extracted from the test sample. Again, it should be noted that the work flow illustrated in FIG. 2 is not limiting, and the present techniques may operate on image data acquired from any suitable system employed for any application. It should be noted that while reference is made in the present disclosure to "imaging" or "image data", in many practical systems this will entail actual optical imaging and extraction of data from electronic detection circuits (e.g., cameras or imaging electronic circuits or chips), although other detection techniques may also be employed, and the resulting electronic or digital detected data characterizing the molecules of interest should also be considered as "images" or "image data".

In the example illustrated in FIG. 2, the nucleotide delivery system 230 provides a process stream 232 to the sample holders 110. An effluent stream 234 from the sample holders 110 (e.g., a flow cell) may be recaptured and recirculated, for example, in the nucleotide delivery system 230. In the illustrated example, the patterned surface of the flow cell may be flushed at a flush station 236 (or in many cases by flushing by actuation of appropriate valving, such as waste valve 120 of FIG. 1) to remove additional reagents and to clarify the sample within the sample holders 110 for imaging. The sample holder 110 is then imaged, such as using line imaging techniques that may be employed in conjunction with time delay and integration (TDI) processing, by an imaging system 10 (which may be within the same device). The image data thereby generated may be analyzed, for example, for determination of the sequence of a progressively building nucleotide chain, such as based upon a template. In one possible embodiment, the imaging system 10 may employ confocal line scanning to produce progressive pixilated image data that can be analyzed to locate individual sites on the patterned surface and to determine the type of nucleotide that was most recently attached or bound to each site.

As noted, the imaging components of the imaging system 10 may be more generally considered a "detection apparatus", and any detection apparatus that is capable of high-resolution imaging of surfaces may be employed. In some examples, the detection apparatus will have sufficient resolution to distinguish features at the densities, pitches and/or feature sizes set forth herein. Examples of the detection apparatus are those that are configured to maintain an object and detector in a static relationship while obtaining an image, such as a series of line image scans in a TDI scanning process. By way of example, line scanning detectors can be configured to progressively scan a line of image data along the y-dimension of the surface of substrate on which sample sites are disposed, where the longest dimension of the line occurs along the x-dimension. It will be understood that the detection device, object, or both can be moved relative to one another to achieve scanning detection. Detection apparatuses that are useful, for example in nucleic acid sequencing applications, are described in U.S. Pat. App. Pub. Nos. 2012/0270305 A1; 2013/0023422 A1; and 2013/0260372 A1; and U.S. Pat. Nos. 5,528,050; 5,719,391; 8,158,926 and 8,241,573, all of which are incorporated herein by reference in their entirety for all purposes.

The patterned surface undergoing scanning may include coarse-alignment markers that distinguish the relative locations of sites on the substrate surface. When used, the coarse-alignment markers can cooperate with the detection apparatus, such as to determine the location of one or more sample sites. Optionally, the relative position and/or motion of the detection apparatus and/or the sample holder 110 having the patterned surface may be adjusted based on the data obtained from imaging the coarse alignment-markers. Thus, the system may function to execute an algorithm on the computer to determine locations for the features in the image data, as well as to characterize molecules at each site, referenced based on the fiducials.

Following imaging (e.g., at imaging system 10), the sample holder 110 may progress to a deblock station 240 for de-blocking, during which a blocking molecule or protecting group is cleaved from the last added nucleotide, along with a marking dye. If the processing system 224 is used for sequencing, by way of example, image data from the imaging system 10 will be stored and forwarded to a data analysis system 226.

The data analysis system 226 may include a general purpose or application-specific programmed computer, which provides a user interface and automated or semi-automated analysis of the image data to determine which of the four common DNA nucleotides may have been last added at each of the sites on a patterned surface, as described below. As will be appreciated by those skilled in the art, such analysis may be performed based upon the color of unique tagging dyes for each of the four common DNA nucleotides. This image data may be further analyzed by the downstream processing/storage system 228, which may store data derived from the image data as described below, as well as the image data itself, where appropriate. Again, the sequencing application is intended to be one example, and other operations, such as diagnostic applications, clinical applications, gene expression experiments, and so forth may be carried out that will generate similar imaging data operated on by the present techniques.

As noted above, in some implementations, the sample holder 110 (e.g., a flow cell) having the patterned surface may remain in a fixed or substantially fixed position, and the "stations" referred to may include integrated subsystems that act on the sample holder 110 as described (e.g., for introduction and reaction with desired chemistries, flushing, imaging, image data collection, and so forth). The data analysis may be performed contemporaneously with the other processing operations (i.e., in "real time"), or may be done post-processing by accessing the image data, or data derived from the image data, from an appropriate memory (in the same system, or elsewhere). In many applications, a patterned surface "container" will comprise a cartridge or flow cell in which the patterned surface exists and through which the desired chemistry is circulated. In such applications, imaging may be done through and via the flow cell. The flow cell may be appropriately located (e.g., in the x-y plane), and moved (e.g., in x-, y-, and z-directions) as needed for imaging. Connections for the desired chemistry may be made directly to the flow cell when it is mounted in the apparatus. Moreover, depending upon the device design and the imaging technique used, the patterned surface, encased in the flow cell, may be initially located in the x-y plane, and moved in this plane during imaging, or imaging components may be moved parallel to this plane during imaging. In general, here again, the "x-y plane" is the plane of the patterned surface that supports the sites, or a plane parallel to this. The flow cell, therefore, may be said to extend in the x-y plane. It is to be understood, however, that this orientation could be reversed. The flow cell and corresponding patterned surface may also be moved in the z-direction, which is the focus-direction, typically orthogonal to both the x- and y-directions. Such movements may be useful for securing the flow cell into place, for making fluid connections to the flow cell, and for imaging (e.g., focusing the optic for imaging sites at precise z-depths). In some applications, the optic may be moved in the x-direction for precise imaging.

FIG. 3 illustrates an example data analysis system 226 and some of its functional components that may be relevant to the present approach. As noted above, the data analysis system 226 may include one or more programmed computers, with programming being stored on one or more machine readable media with code executed to carry out the processes described. Alternatively or in addition, one or more application specific integrated circuits (ASICs) and/or field programmable gate arrays (FPGAs) (or other hardware-based solutions) may be employed to perform some or all of the functionality attributed to the data analysis system 226 as described herein. In the illustrated example, the data analysis system 226 includes an interface 260 designed to permit networking of the data analysis system 226 to one or more imaging systems 10 acquiring image data of patterned surfaces of reaction or sample sites (i.e., features, such as wells) within a sample holder 110. The interface 260 may receive and condition data, where appropriate. In general, however, the imaging system 10 will output digital image data representative of individual picture elements or pixels that, together, form an image of the patterned surface (or a portion (e.g., line or tile) of it). In the depicted example, a processor 262 processes the received image data in accordance with a plurality of routines defined by processing code. The processing code may be stored in various types of memory circuitry 264. As used in this disclosure, the term "machine readable" means detectable and interpretable by a machine, such as a computer, processor, or a computer or processor in cooperation with detection and signal interpretation devices or circuits (e.g., computer memory and memory access components and circuits, imaging or other detection apparatus in cooperation with image or signal interpretation and processing components and circuits), and so forth.

Computers and processors useful for the present techniques may include specialized (e.g., application-specific) circuitry and/or general-purpose computing devices, such as a processor that is part of a detection device, networked with a detection device used to obtain the data that is processed by the computer, or separate from the detection device. In some examples, information (e.g., image data) may be transmitted between components of a data analysis system 226 disclosed herein directly or via a computer network. A Local Area Network (LAN) or Wide Area Network (WAN) may be a corporate computing network, including access to the Internet, to which computers and computing devices comprising the data analysis system 226 are connected. In one example, the LAN conforms to the Transmission Control Protocol/Internet Protocol (TCP/IP) industry standard. In some instances, the information (e.g., image data) is input to a data analysis system 226 disclosed herein via an input device (e.g., disk drive, compact disk player, USB port, etc.). In some instances, the information is received by loading the information, such as from a storage device such as a disk or flash drive.

As noted above, in some examples, the processing circuitry may process image data in real or near-real time while one or more sets of image data of the support, sites, molecules, etc. are being obtained. Such real time analysis is useful for nucleic acid sequencing applications where an imaged surface having attached of nucleic acids is subjected to repeated cycles of fluidic and detection operations. Further, as discussed herein, such real-time analysis may be performed in conjunction with or as part of determining a rate of linear motion of the surface undergoing imaging, which may be of particular relevance in a line scanning implementation where TDI processing is employed. In such instances, accurate measures of linear motion may be particularly relevant for one or both of making real-time adjustments to the rate of linear motion to correspond to an expectation or tolerance established for the process and/or for informing the calculations performed as part of signal integration so that the signals associated with a given sample site can be can be integrated with a high degree of precision.

Analysis of sequencing data can often be computationally intensive such that it can be beneficial to perform the methods in real or near-real time or in the background while other data acquisition or analysis algorithms are in process. The terms "real time" and "near-real time", when used in conjunction with the processing of samples and/or their imaging are intended to convey that the processing occurs at least in part during the time the samples are being processed and imaged (i.e., processing occurs simultaneously or contemporaneously with data acquisition). In other examples, image data may be obtained and stored for subsequent analysis by similar algorithms. This may permit other equipment (e.g., powerful processing systems) to handle the processing tasks at the same or a different physical site from where imaging is performed. This may also allow for re-processing, quality verification, and so forth.

In accordance with the presently contemplated examples, the processing code executed to process or manipulate the image data includes an image data analysis routine 270 designed to analyze the image data. Image data analysis may be used to determine the locations of individual sites visible or encoded in the image data, as well as locations in which no site is visible (i.e., where there is no site or where no meaningful radiation was detected from an existing site). Image data analysis may also be used to determine locations of fiducials that aid in locating the sites.

As will be appreciated by those skilled in the art, in a biological patterned surface imaging context, respective sites of the patterned surface will appear brighter than non-site locations due to the presence of fluorescing dyes attached to the imaged molecules. It will be understood that the sites need not appear brighter than their surrounding area, for example, when a target for the probe at the site is not present in a sample being detected. The color at which individual sites appear may be a function of the dye employed, as well as of the wavelength range of the light used by the imaging system 28 for imaging purposes (e.g., the excitation wavelength range of light). Sites to which targets are not bound or that are otherwise devoid of a label can be identified according to other characteristics, such as their expected location on the patterned surface. Any fiducial markers may appear on one or more of the images, depending upon the design and function of the markers.

Once the image data analysis routine 270 has located individual sites in the image data, a value assignment may be carried out at step 272, often as a function of, or by reference to any fiducial markers provided. In general, the value assignment step 272 will assign a digital value to each site based upon characteristics of the image data represented by pixels at the corresponding location. That is, for example, the value assignment routine 272 may be designed to recognize that a specific color range or wavelength range of light was detected at a specific location within a threshold time after excitation, as indicated by a group or cluster of pixels at the location. The value assignment carried out at step 272 in such a context will assign the corresponding value to the entire site, alleviating the need to further process the image data itself, which will be much more voluminous (e.g., many pixels may correspond to each site) and of significantly larger numerical values (i.e., much larger number of bits to encode each pixel).

By way of further example, the present compositions, devices, and methods suitably can be used so as to generate luminescent images in sequencing-by-synthesis (SBS) techniques and devices. In such SBS approaches, a flow cell or other microfluidic device may include a sample and sample capture sites as described herein and one or more analytes may be flowed over the sites as part of a sequencing operation. A suitable number of luminophores may be employed that can be excited in sequence using any suitable number of excitation wavelengths. By way of example, four distinct excitation sources at four resonant wavelengths ($\lambda_1$, $\lambda_2$, $\lambda_3$, and $\lambda_4$) may be employed in a 4-channel SBS chemistry scheme, or two excitation wavelengths ($\lambda_1$ and $\lambda_2$) may be employed in a 2-channel SBS chemistry scheme, or one excitation wavelength ($\lambda_1$) may be employed in a 1-channel SBS chemistry scheme. Examples of 4-channel, 3-channel, 2-channel or 1-channel SBS schemes are described, for example, in US Pat. App. Pub. No. 2013/0079232 A1, which is hereby incorporated herein by reference in its entirety, and can be modified for use with the apparatus and methods set forth herein. As will be appreciated, in one such SBS approach for use in sequencing DNA using luminescent imaging, a first luminophore can be coupled to A, a second luminophore can be coupled to G, a third luminophore can be coupled to C, and a fourth luminophore can be coupled to T. As another example, in techniques for use in sequencing RNA using luminescent imaging, a first luminophore can be coupled to A, a second luminophore can be coupled to G, a third luminophore can be coupled to C, and a fourth luminophore can be coupled to U.

In practice, in a multi-channel system (e.g., a four-channel system) each respective sequencing-by-synthesis (SBS) cycle has an associated separate excitation and readout operation for each channel and each channel is separately read out each cycle. That is, for each SBS cycle in a four-channel system, there are four excitation and readout operations, each corresponding to a different channel. In a DNA imaging application, for example, the four common nucleotides may be represented by separate and distinguishable colors (or more generally, wavelengths or wavelength ranges of light), each color corresponding to a separate channel that is separately readout out during each SBS cycle.

An indexing assignment routine 274 associates each of the assigned values with a location in an image index or map, which may be made by reference to known or detected locations of fiducial markers, or to any data encoded by such markers. As described more fully below, the map will correspond to the known or determined locations of individual sites within the sample holder 110. Data analysis routines (shown as data stitching step 276 in FIG. 3), which may be provided in the same or a different physical device, allows for identification or characterization of the molecules of the sample present within the sample holder 110, as well as for logical analysis of the molecular data, where desired. For sequencing, for example, the data analysis routines may permit characterization of the molecules at each site by reference to the emission spectrum (that is, whether the site is detectable in an image, indicating that a tag or other mechanism produced a detectable signal when excited by a wavelength of light). The molecules at the sites, and subsequent molecules detected at the same sites may then be assembled logically into sequences. These short sequences may then be further analyzed by the data analysis routines 276 to determine probable longer sequences in which they may occur in the sample donor subject.

It may be noted that as in the illustration of FIG. 3, an operator (OP) interface 280 may be provided, which may consist of a device-specific interface, or in some applications, to a conventional computer monitor, keyboard, mouse, and so forth to interact with the routines executed by the processor 262. The operator interface 280 may be used to control, visualize or otherwise interact with the routines as imaging data is processed, analyzed and resulting values are indexed and processed.

Figure 4:
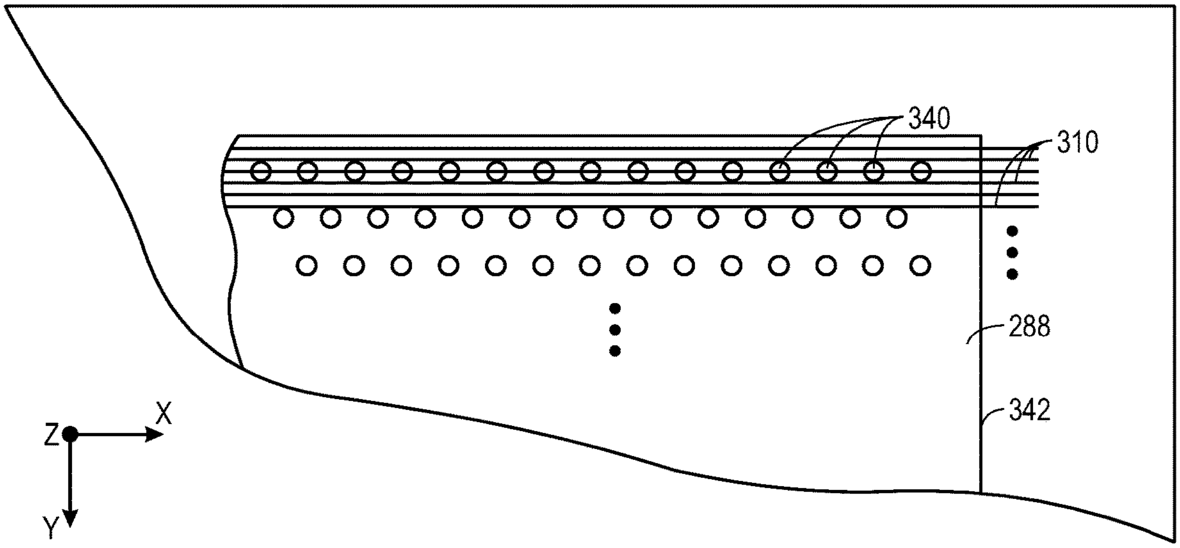
FIG. 4 is a cut-away diagram illustrating sites on an example patterned flow cell surface, in accordance with aspects of the present disclosure.

FIG. 4 illustrates, by way of example, scan lines 310 over a plurality of sample sites 340 (e.g., wells or nanowells) provided on a patterned surface 288. By way of example, in the context of a flow cell the sites 340 may be gel-filled wells, each well occupied by a nucleic acid (e.g., DNA) colony. As noted above, in some implementations, the sites 340 may be laid out in any suitable pattern. In the illustrated example, the sites 340 are laid out in a hexagonal pattern, although rectangular patterns (e.g., rectilinear patterns), and other patterns may be employed. The location of each site 340 will be known with reference to one or more fiducial or reference features, such as an edge 342 of the grid or portion of the patterned surface 288 or a coarse alignment fiducial (e.g., a bullseye fiducial).

With the preceding background and context in mind, certain embodiments discussed herein utilize features on the sample substrate (e.g., flow cell) itself to control, adjust, and/or calibrate motion feedback during a scan operation. By way of example, nanoscale features of the sample substrate, such as nanowells or sites on or in which sample is disposed or patterned features formed as part of a layer of the flow cell, may be used as part of the feedback mechanism. In certain such implementations, a nanopatterned periodic set of features may be provided as part of the sample substrate and may be used to facilitate the motion feedback calculations and/or operations.

In one embodiment, and as described below, periodic or repeating discernible patterns or sequences formed by the nanowells of a patterned surface may be leveraged to provide or to derive data regarding relative linear translation velocity of the flow cell in the scanning direction during a scan operation. In particular, optical scanning of the nanowells, and patterns formed using such nanowells, may be employed in a continuous or intermittent (e.g., periodic or non-periodically intermittent) mode of operation to obtain image data from which estimates or measurements of linear motion of the flow cell over time are derived during a scanning operation. As may be appreciated, in implementations employing the optical imaging system for linear motion assessment, the changes in observed optical signal attributable to a pattern of the nanowells may be tracked over time as the stage undergoes relative motion as part of scanning the sample(s). While assessment of linear motion and velocity in the scanning direction is one benefit of the presently described techniques, in practice the measurements obtained may be used to derive not only a linear translation velocity, but also other position or motion measures of interest, such as position in the scanning direction, drift in the cross-sample direction, rotation and/or skew, and so forth By way of further example, the nanowells, in accordance with their overall and localized patterns, modulate the observed optical signal while moved and scanned over time in a manner that can be processed to derive motion and/or position data. The observed signal modulation, in accordance with this approach, may be provided as or used to derive feedback for the actuators controlling motion of stage 170 and/or optic motion mechanisms of the imager system 10 in the scanning direction so as to adjust, calibrate, or otherwise control relative motion (e.g., linear motion velocity) of the flow cell during a scan operation. In addition or in the alternative, the relative linear motion (e.g., velocity) derived from the measured signal intensity modulation may be provided to a controller or computational component e.g., processor) performing signal integration so as to facilitate aggregating or integrating signals associated with respective sites properly in a TDI context.

As described herein, certain of the presently contemplated techniques utilize an open-loop controlled stage 170 in conjunction with a search algorithm to locally interrogate a last-known good (i.e., verified) location for a flow cell. The optical imaging sub-system of the optical image scanning system 10 may be employed to evaluate the features (e.g., sample wells or nanowells) at a current location on the flow cell through the imaging objective (e.g., objective lens 142) and compare this location to an expected pattern, which may be determined based on the known placement of the features on the scanned surface of the flow cell and the assumed or expected linear motion or translation. As noted herein, this may occur without a separate and distinct optical encoder or, alternatively, with a lower quality (e.g., lower resolution, lower cost) encoder than might otherwise be employed for the application.

Based on the output of this evaluation, the motion feedback system may continue searching or, if the expected region was in view (e.g., based on pattern determination), adjust the internal model of the stage 170 to close the feedback loop. Based on this approach, as a given pixel undergoes relative motion during imaging, position data may be averaged over a period of time. Position and/or motion (e.g., translation speed) in the y-dimension (i.e., scan direction) may be calculated based on where a flow cell feature (e.g., nanowell) is identified in the image data. In this manner, the motion feedback system may use the optical system that is already present for sample imaging to additionally perform or correct motion control. Among other benefits, this may allow for a relaxation in the precision of the alignment required of the flow cell relative to the imaging instrument, as the imaging system would automatically adjust based on each flow cell. As discussed herein, the arrangement or pattern of the sample sites on the patterned flow cell in general or subsets of the sample sites at known locations on the patterned flow cell may constitute one or more fiducials that are imaged by the imaging system (e.g., a nucleic acid sequencer system) to determine the location and/or motion of the stage 170 on which the pattern flow cell is positioned. As may be appreciated, in contrast with a separate and distinct optical encoder-based system, the present techniques instead employ the optical imaging system already present in the sequencer instrument to perform motion control in addition to its primary function of detecting fluorescent molecules.

Figure 5:
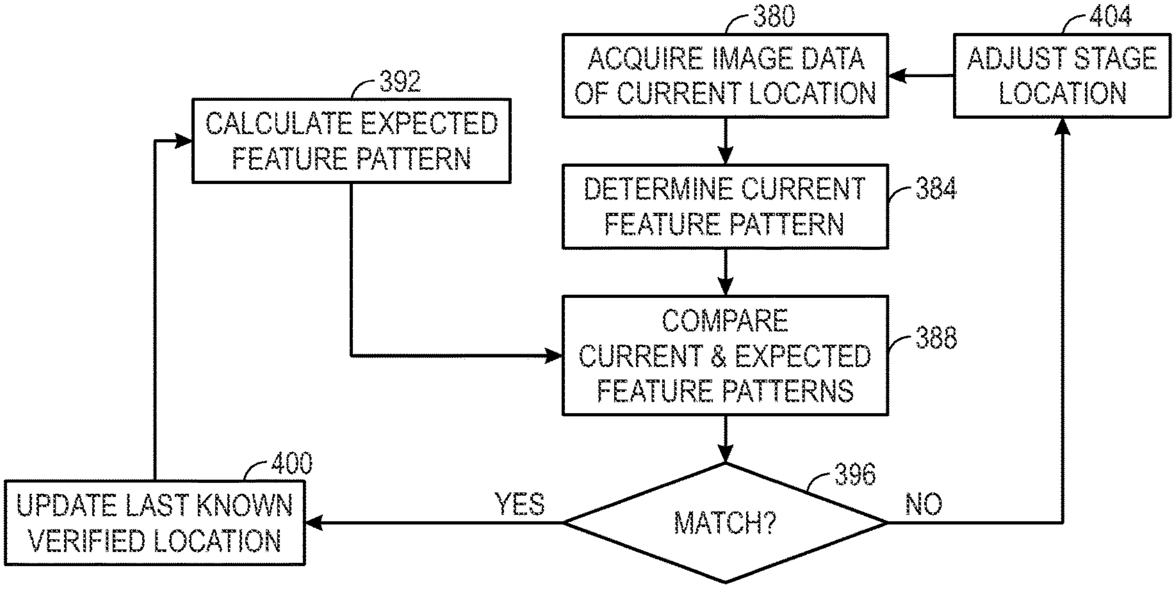
FIG. 5 depicts a process flow diagram of steps that may be performed in determining a current location on a patterned flow cell, in accordance with aspects of the present disclosure.

A visual representation of a high-level process flow for one such approach is illustrated in FIG. 5. In this example, image data is acquired (block 380) during the course of a scan or sequencing operation. The image or image data acquired at this stage may be analyzed or otherwise assessed to determined (block 384) a feature pattern (e.g., a pattern of sample sites or nanowells in a sequencing context) currently present in the current image. Examples of patterns or arrangement of features that may be employed to facilitate detection and/or comparison of feature patterns are described in greater detail below.

With the preceding in mind, a comparison is made (block 388) between the currently visible feature pattern and an expected feature pattern. By way of example, the expected feature pattern may be calculated (block 392) or otherwise derived based on a last known verified location of the flow cell (and the corresponding pattern of known features on the flow cell) and the expected or estimated motion undergone by the flow cell since the last known verified location. That is, based on knowledge of the position of the different features on the flow cell, a last known verified location of the flow cell (e.g., image data of the flow cell for which the location on the flow cell was verified based on feature comparison), and an expected or estimated motion undergone by the flow since the last known verified location, an expected feature pattern may be derived and compared block 388 to the actual observed feature pattern in the current image data.

As shown in FIG. 5, if the currently observed feature pattern and the expected feature pattern are compared (block 388) and determined to match (precisely or within an acceptable tolerance) at decision block 396, the last known verified location of the flow cell is updated (block 400) to correspond to the current location. Conversely, if it is determined that the current feature pattern and the expected feature pattern do not match, the current image data may be search be searched to locate the expected feature pattern within another portion of the image data where it was not expected and/or, if such a search is unsuccessful, additional image data may be acquired, such as in adjacent flow cell regions, until the expected pattern is located. At this point, the stage location may be updated or adjusted (block 404) and scanning or sequencing resumed, with additional image data being acquired. Additionally, the last known verified location may be updated (block 400) to reflect the successful matching of the expected feature pattern and the observed feature pattern.

With respect to feature design and layout on the flow cell, the signals acquired and used for feature pattern analysis and comparison should be robust to low signal, intensity variation, sparse clusters or cluster formation, de-focus, and x- and/or y-dimension vibration or drift.

In certain embodiments, fiducials formed in the scanning direction (i.e., y-dimension) and comprising patterns or arrangements of sample sites as observed with respect to the scanning direction may be employed to obtain motion data. By way of example, such a fiducial pattern or sequence of sample sites (e.g., nanowells) may be characterized as "vertical fiducials" and may provide useful information about linear motion (e.g., position and/or velocity) in the scanning direction. In certain embodiments, such a vertical fiducial may comprise a pattern or sequence in which one or more sample sites (e.g., nanowell locations) may be "blanked" out so as to create breaks in the overall pattern or sequence (e.g., a hexagonal pattern) of nanowell sites. By way of example, a vertical fiducial may be understood to be a fiducial or fiducial region comprising a combination of sample sites (e.g., nanowells) and "blank" regions or wells (e.g., locations where a well would normally be formed (e.g., nano-imprinted) in accordance with the non-fiducial pattern (e.g., hexagonal pattern) but where no sample site was formed (or fully formed) during fabrication or where a well has been formed but which contains no sample. Thus, in this context and in various embodiments discussed herein a vertical fiducial may comprise: a full row or column of sample sites between respective rows or columns of "blank" sites or wells; a partial row of sample sites (e.g., alternating sample wells and "blanks") between respective rows of "blank" sites or wells; or multiple rows or columns of sample sites, each row or column comprising both sample sites and "blanks" but in which every row or column has at least one sample site (i.e., there are no "site-free" rows within the fiducial).

Figure 6:
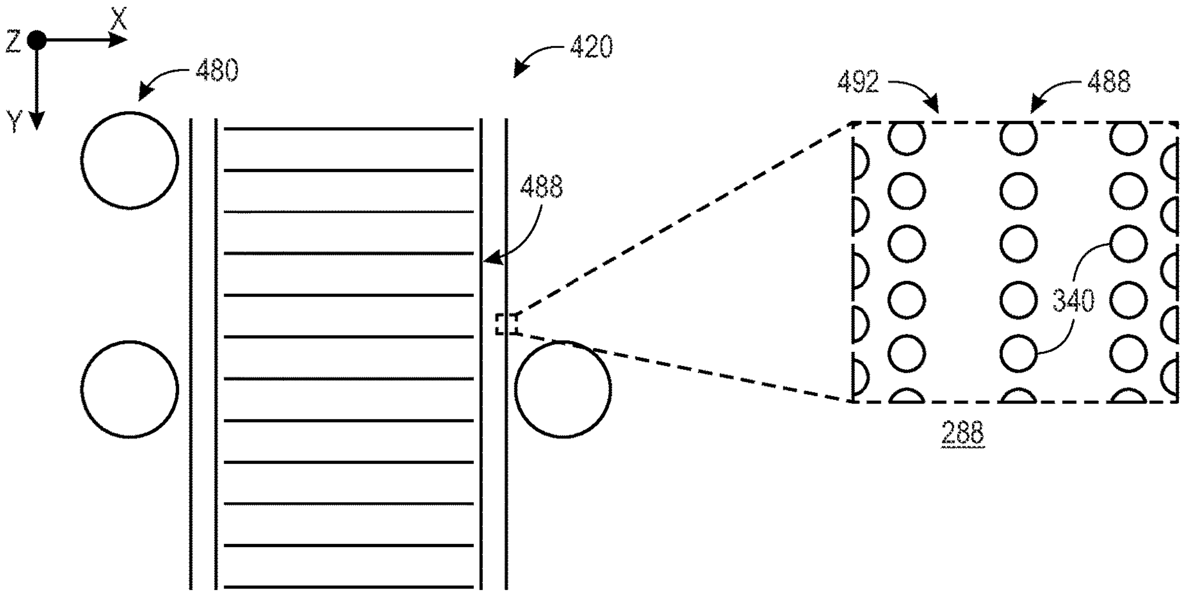
FIG. 6 depicts a plan view of a patterned flow cell surface in conjunction with different fiducials provided on the surface, including fiducials comprising sample nanowells in patterned arrangements, in accordance with aspects of the present disclosure.

In the present context, such vertical fiducials may be employed to resolve the position and/or motion of a flow cell during a scan operation. By way of example, and turning to FIG. 5, an embodiment of a flow cell 420 is illustrated on the left that employs coarse alignment fiducials markers 480 (e.g., bullseye fiducials) for performing coarse alignment and registration functions and vertical fiducials 488 (comprising patterns or arrangements of sample sites (e.g., nanowells 340) and blank regions 492 in the underlying sample site pattern) for detecting linear motion and/or position in the y-dimension. While the leftmost image in FIG. 6 illustrates a possible arrangement of these types of fiducials on a flow cell 420, an enlarged view of the vertical fiducial 488 is illustrated on the lower right of the figure. In practice, and as discussed herein, the vertical fiducials 488 may be scanned using the optical imager of a sequencer system as part of a nucleic acid sequencing operation and the information used in place of an encoder system to monitor linear motion in the y-dimension (i.e., the scan direction).

With the preceding in mind, and in the context of a time delay and integration (TDI), the present techniques allow the use of imaged sample sites (e.g., nanowells) provided on a flow cell surface to resolve and measure position of the flow cell and, correspondingly, the linear movement of the flow cell over time. By way of example, based on the image data, pixel averaging may be performed over time to identify the location of a given sample site (based on a known pattern of sample site distribution) and to thereby allow determination and tracking of the sample site, and thereby determination of the motion of the flow cell. That is, at a given moment in time, all pixels undergo the same motion. In the next interval (e.g., the next image data acquisition, the movement of the flow cell is shifted by a pixel such that as the flow cell is translated with respect to a given imaged pixel position data may be averaged over a period of time. Based on this, position and/or velocity in the y-dimension may be calculated based on where a respective nanowell is identified in the image and/or on the measured or observed variance in the brightness or intensity signal (e.g., a sinusoidal signal) attributable to the motion of the pattern of nanowells forming a fiducial pattern or sequence of sites (e.g., a vertical fiducial).

By way of example, in a linear or line scan context (as may be employed in TDI imaging) the moving average position information for a respective sample site (e.g., a sample site identified based on inclusion within a vertical fiducial) may be determined from a series of line images acquired over a time interval (e.g., as the camera and/or flow cell are moved relative to one another). In such an example, the respective sample site's position is a moving average of all of the stage positions over the prior n pixels, which may include motion blur and/or discretization errors. In such a context, the current position of the stage 170 based on the identified sample site(s) may be averaged into the positions of all of the sample sites (e.g., nanowells) currently exposed to the camera. In one implementation, the current position information for the stage 170 may be read out half an exposure later and the position information captured in the image data is an average over the whole exposure, not the actual position.

In practice, due to the processing of the image data, some degree of delay may be present in the stage motion control loop, however such a delay may be acceptable so long as the requisite image data bandwidth is achieved. By way of example, in one embodiment, an upper bound of approximately a 90 KHz signal may be appropriate, corresponding to the use of approximately 3 pixels to calculate linear velocity and/or position in the scan direction (i.e., the y-dimension). Similarly, a delay of 14 μs (assuming a 70 KHz signal) would employ an approximately 4-pixel image to calculate linear velocity and/or position in the scan direction. In practice, a delay of up to 50 μs may exist without negatively impacting the motion control sub-system, which may operate at an approximately 20 KHz scan speed (i.e., sampling rate) in some embodiments. With this in mind, such negligible delays incurred from determining position and/or motion of the stage (and correspondingly, of the flow cell) from the motion data itself may allow for effectively real-time motion control of the stage 170 and/or dynamic triggering of the camera in a TDI context.

The preceding examples are based primarily on the use of conventional features, such as sample-containing nanowells, present as part of a known pattern on the surface of a flow cell for y-dimension position and/or motion estimation. The y-dimension position or motion estimates may be used to facilitate stage motion control, camera triggering, and/or image correction or post-processing. In certain contemplated embodiments, the features employed on the flow cell may be or may include sample sites having one or more geometric parameters different than what is observed in other regions of the flow cell (i.e., different than what is observed in non-linear fiducial regions). Such selective variations in nanowell geometry may correspond to a change in brightness of the feature in question. By way of example a diameter and/or depth of a circular flow cell may be a non-standard value for one or more nanowells forming a fiducial pattern of sample sites in certain embodiments. With this in mind, FIGS. 7-10 illustrate variations in features that may be employed in accordance with the present approaches and how such variations may be observed as a function of position along the scan and observed brightness. In practice, such variations may provide increased sensitivity and/or resolution with respect to the estimation of position and/or linear displacement velocity. For example, such geometrically varied features may provide a graded response between full brightness and no brightness (e.g., half brightness) that may effectively provide a higher resolution with respect to position estimation by tightening the observed sinusoidal signal associated with brightness measurements obtained using such signals. Similarly, different shapes of features (e.g., a bar instead of circular features) may provide similar benefits. Further, in some embodiments one or more materials (e.g., a reflective or refractive material) may be employed in forming such features, either on a same surface of the layer of the flow cell on which the nanowells are formed, on an opposite surface of such a layer, or on a different layer of the flow cell (e.g., a substrate layer) than that on which the nanowells are formed. By way of example, in certain such embodiments the material may fluoresce at wavelengths different than those wavelengths at which the sample fluoresces.

Figure 7:
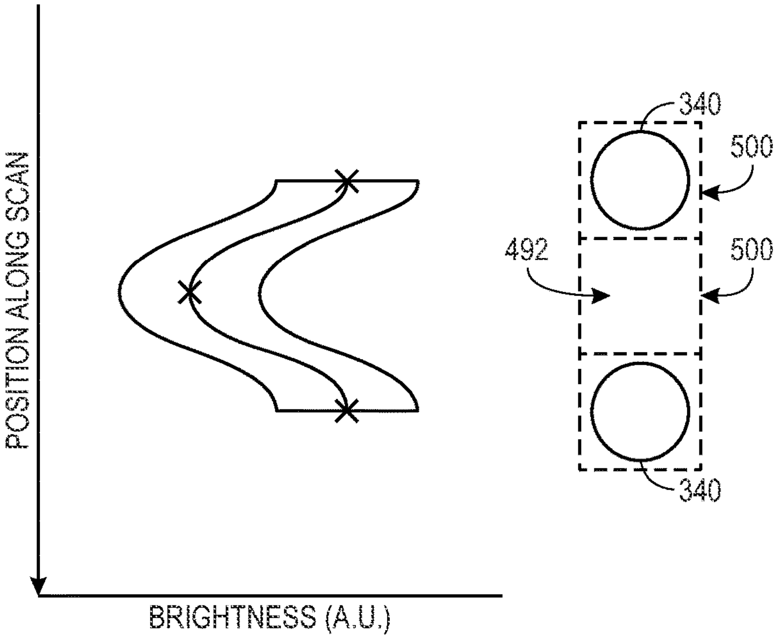
FIG. 7 depicts a first example of a pattern of nanowells suitable for use in a fiducial, in accordance with aspects of the present disclosure.

With the preceding in mind, FIG. 7 depicts an example of a sample well arrangement, and corresponding signal, that may be employed in a fiducial sample site pattern or sequence (e.g., a vertical fiducial) as described herein. In this example the pattern of nanowells forming all or part of the vertical fiducial comprises a binary alternating pattern (e.g., off/on) of two nanowells 340 separated by a blank region 492 in the underlying nanowell pattern. In one embodiment the binary alternating pattern has a pitch of 1 pixel 500 corresponding to the nanowell size. As illustrated, by introducing a blank region 492 in an otherwise columnar pattern of nanowells 340, the plot of position along the scan in the y-dimension versus observed brightness yields a sinusoidal plot when imaged pixelwise line-by-line. In this manner, the peaks (or valleys) in such a signal may convey information about the linear translation velocity akin to measuring encoder tick marks, but relying on the imager subsystem as opposed to a linear optical encoder.

Figure 8:
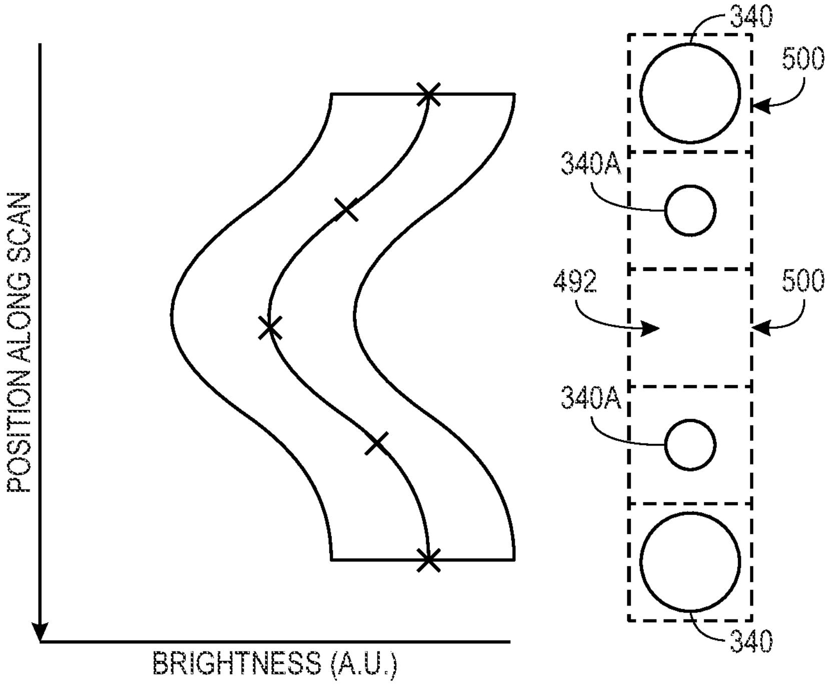
FIG. 8 depicts a second example of a pattern of nanowells suitable for use in a fiducial, in accordance with aspects of the present disclosure.
Figure 9:
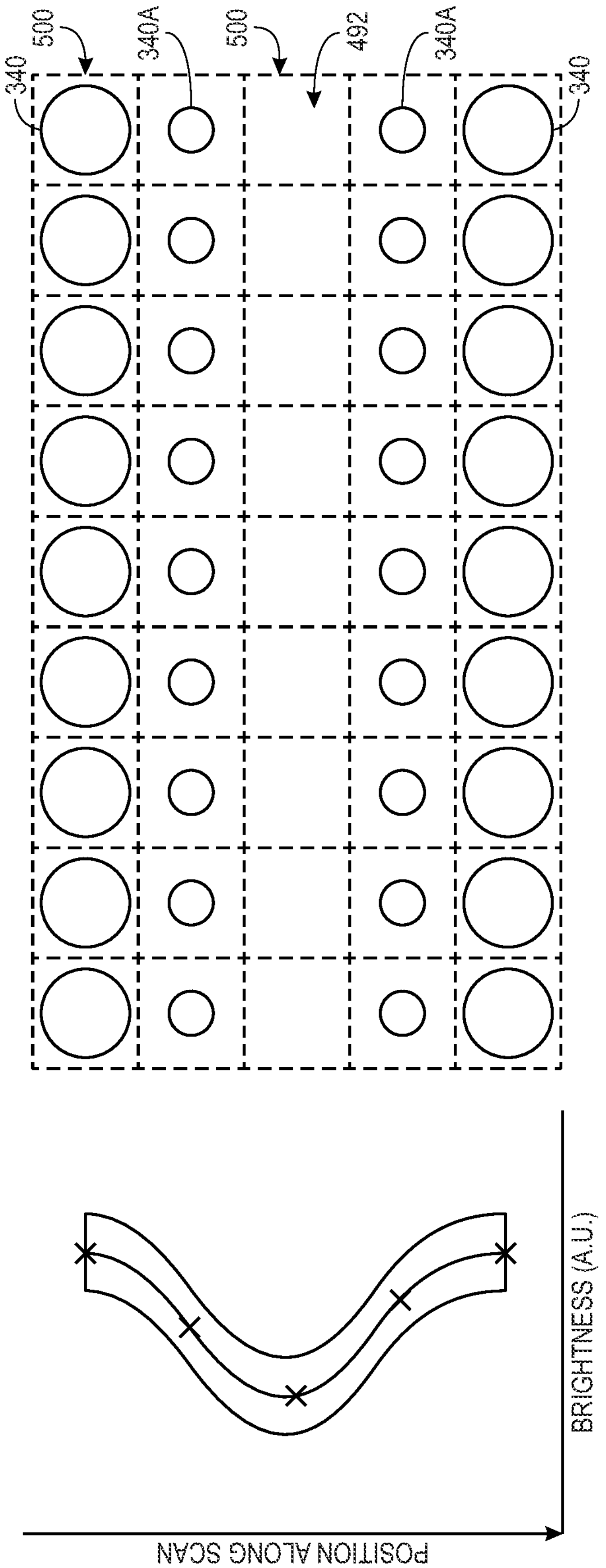
FIG. 9 depicts a third example of a pattern of nanowells suitable for use in a fiducial, in accordance with aspects of the present disclosure.
Figure 10:
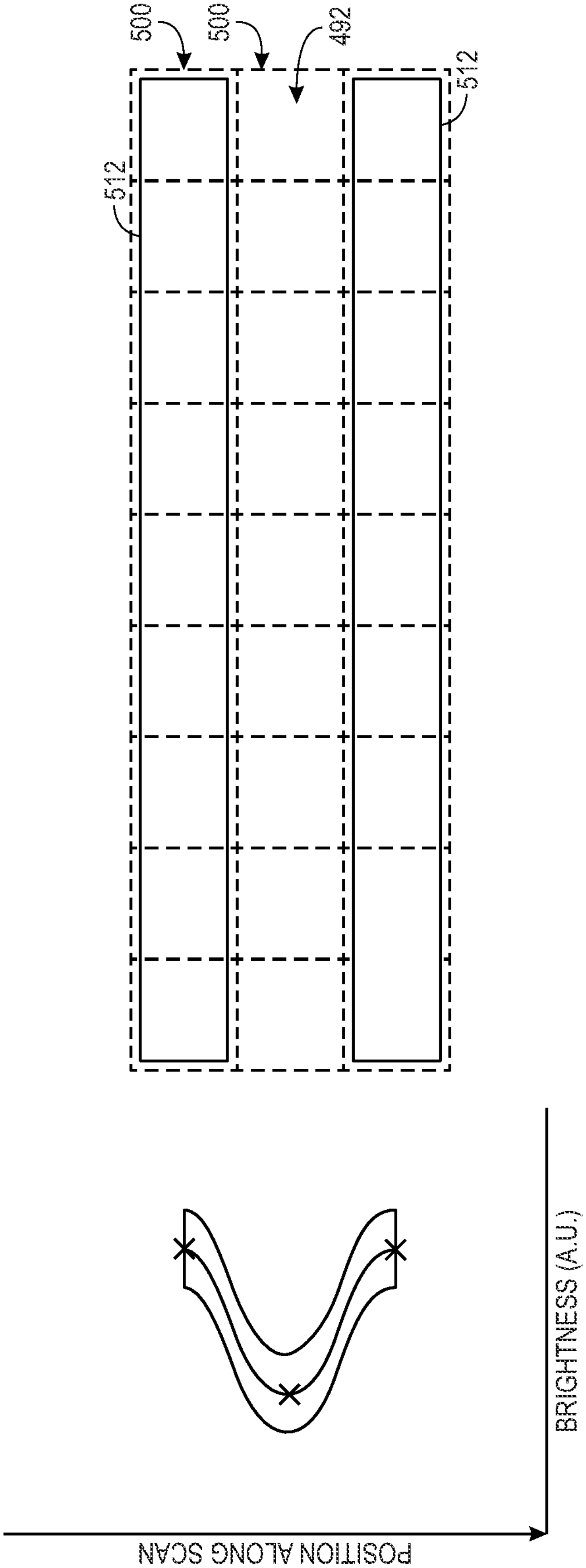
FIG. 10 depicts a fourth example of a pattern of nanowells suitable for use in a fiducial, in accordance with aspects of the present disclosure.

Turning to FIG. 8, a variation in this approach is illustrated in which nanowells 340A are introduced having different parameters (e.g., different geometric (e.g., diameter or circumference) or brightness parameters) than the conventional nanowells 340. By employing nanowells having different signal properties, a pattern with analog varying brightness may be achieved (e.g., full brightness sites, half or partial brightness sites, and no brightness sites). Such variations may be achieved by varying the size of the nanowell (i.e., the bright area) and/or by varying the brightness within the area of the nanowell, such as by varying the concentration of the fluorophore being assessed, by varying the number of fluorophore binding sites, by modifying the available sites initially manufactured, and/or by removing binding sites (e.g., nanowells) after initial manufacture. In this manner, greater granularity in measured signal may be obtained over the range corresponding to the vertical linear fiducial of nanowells 340, 340A and blank regions 492. Such increased granularity may provide additional data which may be reflected in the corresponding sinusoidal signal. In the depicted example this may be manifested as a wider pitch of the sinusoidal signal relative to the binary approach described with respect to FIG. 7.

While the preceding example fiducial patterns have been described in the context of a single column of pixels 500, it may be appreciated that in other contexts it may be useful to employ a multi-column approach to the fiducial pattern of features (e.g., sample sites, such as nanowells). An example of such an approach is illustrated with respect to FIG. 9, in which the graded approach described with respect to a single column of pixels 500 in the example of FIG. 8 is expanded to encompass multiple columns. Such a multi-column approach may provide a benefit of increasing accuracy by averaging multiple columns (e.g., 2, 3, 4, 5, 6, 7, 8, 9, 10, and so forth) of pixels 500.

Similarly, in another multi-column embodiment one or more features may be employed as part of the fiducial pattern that differ from the sample sites found elsewhere on the flow cell. By way of example, and turning to FIG. 10, solid regions, such as the depicted bars 512, may be provided across multiple pixel columns so as to provide contiguous bright areas during a scan so as to maximize observed signal and minimize the area utilized to achieve the desired or sufficient signal. In practice the contiguous features such as the bars 512 may be formed similar to the sample sites, such as utilizing binding sites and fluorophores. Alternatively, in other embodiments the contiguous features may be formed during manufacture using a reflective or refractive material either on a same surface of the layer of the flow cell on which the nanowells 340 are formed, on an opposite surface of such a layer, or on a different layer of the flow cell (e.g., a substrate layer) than that on which the nanowells are formed. In certain such embodiments the material may fluoresce at wavelengths different than those wavelengths at which the sample fluoresces.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A patterned flow cell, comprising:

a substrate;

a plurality of sample sites in a non-fiducial region of the substrate, wherein the plurality of sample sites is arranged in a periodic pattern; and a plurality of sample site-based fiducials formed on the substrate in a scanning direction, wherein the sample site-based fiducials comprise an arrangement of sample sites and blank regions formed linearly in a first dimension associated with a scan direction of the patterned flow cell and wherein the sample site-based fiducials comprise, within a column of pixels, a pattern of sample sites having a first value of a geometric parameter, sample sites having a second value of the geometric parameter, and one or more blank regions.

2. The patterned flow cell of claim 1, wherein the periodic pattern comprises a hexagonal or a rectilinear pattern.

3. The patterned flow cell of claim 1, wherein the blank regions correspond to locations in the periodic pattern where a sample site should be located but is not or where empty sample sites are located.

4. The patterned flow cell of claim 1, wherein a plot of brightness versus position along the scan direction for the sample site-based fiducials corresponds to a sinusoidal waveform.

5. The patterned flow cell of claim 1, wherein the sample site-based fiducials comprise, within a column of pixels, a plurality of alternating sample sites and blank regions.

6. The patterned flow cell of claim 5, wherein the sample site-based fiducials comprise pairs of sample sites and one or more blank regions disposed between the pair of sample sites within the column.

7. The patterned flow cell of claim 1, wherein the geometric parameter comprises one or both of diameter or depth.

8. The patterned flow cell of claim 1, wherein the sample site-based fiducials comprise a first pair of sample sites having a first diameter, a second pair of sample sites having a second diameter less than the first diameter and positioned between the first pair of sample sites within the column, and the one or more blank region positioned between the second pair of sample sites within the column.

9. A patterned flow, comprising:

a substrate;

a plurality of sample sites in a non-fiducial region of the substrate, wherein the plurality of sample sites is arranged in a periodic pattern; and a plurality of sample site-based fiducials formed on the substrate in a scanning direction, wherein the sample site-based fiducials comprise an arrangement of sample sites and blank regions formed linearly in a first dimension associated with a scan direction of the patterned flow cell, wherein the sample site-based fiducials comprise a multi-column fiducial, wherein each column of the multi-column fiducial comprises a pattern of sample sites having a first value of a geometric parameter, sample sites having a second value of the geometric parameter, and one or more blank regions.

10. The patterned flow cell of claim 9, wherein each column of the multi-column fiducial comprises a first pair of sample sites having a first diameter, a second pair of sample sites having a second diameter less than the first diameter and positioned between the first pair of sample sites within the respective column, and the one or more blank region positioned between the second pair of sample sites within the respective column.

11. A patterned flow cell, comprising:

a substrate;

a plurality of sample sites in a non-fiducial region of the substrate, wherein the plurality of sample sites is arranged in a periodic pattern; and a plurality of fiducials provided on the substrate in a first dimension associated with a scan direction of the patterned flow cell, wherein each fiducial comprises a plurality of features that are separated by one or more blank regions, wherein each feature is contiguous across one or more columns of the periodic pattern, and wherein each fiducial comprises a pair of bar-shaped features each formed lengthwise in a second dimension perpendicular to the first dimension and corresponding to a cross-sample direction perpendicular to the scanning direction associated with the patterned flow cell.

12. The patterned flow cell of claim 11, wherein each feature comprises a reflective feature formed on or in the patterned flow cell.

13. The patterned flow cell of claim 11, where each feature comprises a fluorescent feature formed on or in the patterned flow cell.

14. The patterned flow cell of claim 13, wherein each feature fluoresces at different wavelengths than the sample sites.

15. The patterned flow cell of claim 11, wherein a respective blank region is present between each pair of bar-shaped features of each respective fiducial.

16. A sequencing instrument, comprising:

a sample stage configured to support a flow cell;

an objective lens, a photodetector, and a light source configured to operate in combination to image the flow cell when present on the sample stage; and a controller configured to perform operations comprising:

advancing the flow cell when undergoing an imaging operation along a linear scan path;

imaging a patterned surface of the sample container as it is advanced along the linear scan path, wherein the patterned surface comprises:

a plurality of sample sites arranged in a periodic pattern, wherein a subset of the sample sites are sample site-based fiducials comprising an arrangement of sample sites and blank regions formed linearly in a first dimension associated with a scan direction of the patterned flow cell;

determining a current feature pattern of the flow cell based on the sample-site based fiducials;

comparing the current feature pattern with an expected feature pattern; and adjusting one or both of a location of the sample stage or a speed at which the sample stage is moved based upon the comparison of the current feature pattern with the expected feature pattern.

17. The sequencing instrument of claim 16, wherein comparing the current feature pattern with the expected feature pattern comprises evaluating a sinusoidal waveform derived from the sample site-based fiducials.

18. The sequencing instrument of claim 16, wherein the controller is further configured to perform operations comprising:

determining at least a rate of motion of the flow cell in the scan direction based on a sinusoidal signal derived based on the sample site-based fiducials.

19. The patterned flow cell of claim 9, wherein a plot of brightness versus position along the scan direction for the sample site-based fiducials corresponds to a sinusoidal waveform.

20. The patterned flow cell of claim 9, wherein the geometric parameter comprises one or both of diameter or depth.

* * * * *